(12) United States Patent
Yoshinaga et al.

(10) Patent No.: US 8,416,174 B2
(45) Date of Patent: Apr. 9, 2013

(54) DISPLAY APPARATUS

(75) Inventors: Hideki Yoshinaga, Yokohama (JP); Hideo Mori, Yokohama (JP); Hideaki Okamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/553,038

(22) PCT Filed: Dec. 8, 2004

(86) PCT No.: PCT/JP2004/018685
§ 371 (c)(1),
(2), (4) Date: Jun. 25, 2008

(87) PCT Pub. No.: WO2005/055030
PCT Pub. Date: Jun. 16, 2005

(65) Prior Publication Data
US 2008/0303774 A1    Dec. 11, 2008

(30) Foreign Application Priority Data

Dec. 8, 2003  (JP) ................................. 2003-409150
Dec. 24, 2003  (JP) ................................. 2003-428471

(51) Int. Cl.
*G09G 3/36* (2006.01)
(52) U.S. Cl.
USPC ........................................... 345/98; 345/173
(58) Field of Classification Search ................... 345/156, 345/173, 98; 313/498; 349/113; 178/18.07, 178/19
See application file for complete search history.

(56) References Cited

U.S. PATENT DOCUMENTS

| | | | |
|---|---|---|---|
| 3,612,758 A | 10/1971 | Evans et al. | 178/5.4 R |
| 5,220,444 A * | 6/1993 | Mitsui et al. | 349/113 |
| 5,444,190 A | 8/1995 | Yamanami et al. | 178/18 |
| 5,912,654 A | 6/1999 | Ouchi et al. | 345/98 |
| 6,078,318 A | 6/2000 | Mori et al. | 345/204 |
| 6,229,259 B1 * | 5/2001 | Christensen, Sr. | 313/498 |
| 6,335,720 B1 | 1/2002 | Mori et al. | 345/98 |
| 6,388,729 B2 * | 5/2002 | Ahn et al. | 349/190 |

(Continued)

FOREIGN PATENT DOCUMENTS

| | | |
|---|---|---|
| EP | 0 461 614 | 12/1991 |
| EP | 0 511 406 | 11/1992 |

(Continued)

OTHER PUBLICATIONS

L. Ferraris, "EMI Shielding-Common Problems and Containment Strategies", Electromagnetic Compatability Proceedings, international Symposium on Beijing, China, pp. 86-89 (May 21, 1997).

(Continued)

*Primary Examiner* — Quan-Zhen Wang
*Assistant Examiner* — Yuk Chow
(74) *Attorney, Agent, or Firm* — Fitzpatrick, Cella, Harper & Scinto

(57) ABSTRACT

A display apparatus includes a substrate having a metal layer, a display device disposed on the substrate, with the display device including a display portion and a driving portion, and a sensor portion for detecting a coordinate using electromagnetic induction. The sensor portion is arranged on an opposite side of the substrate from where the display device is disposed, and the metal layer of the substrate has an electromagnetic wave transmissive structure.

10 Claims, 11 Drawing Sheets

U.S. PATENT DOCUMENTS

| | | | |
|---|---|---|---|
| 6,445,489 B1 | 9/2002 | Jacobson et al. | 359/296 |
| 6,489,899 B1 | 12/2002 | Ely et al. | 341/20 |
| 7,755,616 B2 * | 7/2010 | Jung et al. | 345/174 |
| 7,796,122 B2 * | 9/2010 | Shih | 345/173 |
| 2002/0063694 A1 * | 5/2002 | Keely et al. | 345/173 |
| 2002/0167619 A1 * | 11/2002 | Bietsch et al. | 349/1 |
| 2002/0179339 A1 * | 12/2002 | Ely et al. | 178/18.07 |

FOREIGN PATENT DOCUMENTS

| | | |
|---|---|---|
| JP | 6-236231 | 8/1994 |
| JP | 8-202487 | 9/1996 |
| JP | 9-211449 | 8/1997 |
| WO | WO 92/16368 | 10/1992 |

OTHER PUBLICATIONS

V.A. Soglasnova, et al., "Amplitude and Phase Characteristics of Metal Meshes-The Elements of Submillimeter interference Filters", International Journal of Infrared and Millimeter Waves, vol. 14, No. 1, pp. 155-168 (Jan. 1993).

W. Jing, et al., "The Calculating and Analysis of Shielding Effectiveness of Metal Meshes in Transient Electromagnetic Interference", Environment Electromagnetics, Proceedings, Asia-Pacific Conference of Hangzhou, pp. 379-385 (Nov. 4-7, 2003).

* cited by examiner

DISPLAY APPARATUS

TECHNICAL FIELD

The present invention relates to a display apparatus, particularly a display apparatus capable of performing pen input.

BACKGROUND ART

With development of information equipment, the needs for low-powder and thin display apparatuses have grown, so that extensive study and development have been made on display apparatus fitted to these needs.

Particularly, such a display apparatus if frequently used outdoors as a wearable PC (personal computer), an electronic notepad, etc., so that it is desirable that the display apparatus is of power and space saving type. For this reason, e.g., such apparatuses in which a display function of a thin display such as a liquid crystal display and a coordinate input process are integrated and a user can directly input information (data) to be displayed on the display by a pressing operation with a pen or finger have been commercialized.

In these equipments, the user operates the equipments by designating a position with the pen or finger on the display apparatuses. For this reason, in order to detect the position, a transparent sheet for sensing the contact of the user's finger or the pen to detect its contact position is disposed on the display apparatuses in many cases.

As another method, Japanese Laid-Open Patent Application (JP-A) Hei 06-236231 has proposed such a scheme that an electromagnetic induction interaction is caused between a metal coil and is incorporated in a pen and a metal coil provided to a detecting device disposed under a display apparatus, thereby to permit detection of a designated position.

Such a so-called electromagnetic induction-type coordination position detection apparatus is used in combination with a display apparatuses to permit handwriting input with a special-purpose pen. Thus, it can be considered that a wearable PC of power and cost saving type or a paper like display in which a user can take notes is realized.

FIG. 9 is a schematic view showing an embodiment of a conventional display apparatus having a pen input function. The display apparatus includes a display panel $P_0$ for displaying, e.g., an image or a character, an input pen 2 for inputting various pieces of information, and a sensor unit $S_0$ for sensing (detecting) a position of the input pen 2 according to an electromagnetic induction scheme. In the input pen 2, a resonance circuit is disposed, and in the sensor unit $S_0$, a sensor coil is disposed, thus permitting detection of a coordinate position according to the electromagnetic induction scheme. $A_0$ represents a plate-like member and is integrally formed with the display panel $P_0$ in order to maintain a strength of the display panel $P_0$.

As one of display apparatuses of thin and lightweight display type for use in the wearable PC, an electrophoretic display apparatus has been proposed in U.S. Pat. No. 3,612,758.

This electrophoretic display apparatus includes a pair of substrates oppositely disposed with a spacing, an insulating liquid filled in the spacing between the substrates, electrophoretic particles dispersed in the insulating liquid, and a display electrode disposed along each of the substrates at each pixel.

The electrophoretic particles are electrically charged positively or negatively, so that they are adsorbed by either one of the display electrodes (upper and lower electrodes) depending on a polarity of a voltage applied to the display electrodes. For example, by controlling a display state so as to be placed in a state such that the electrophoretic particles are adsorbed by the upper electrode and the color thereof is observed and a state such that the electrophoretic particles are adsorbed by the lower electrode and the color of the insulating liquid is observed, it becomes possible to display various images. Hereinafter, the display apparatus of such a type is referred to as a "vertical movement type display apparatus".

As another display apparatus, a display apparatus of a horizontal movement type as shown in FIGS. 10(*a*) and 10(*b*) has been proposed in JP-A Hei 09-211499.

In the display apparatus of this type, different from the above described vertical movement type display apparatus such that the upper and lower electrodes are disposed to sandwich the insulating liquid, electrodes are arranged on one of a pair of substrates. In an embodiment shown in FIGS. 10(*a*) and 10(*b*), a first electrode (common electrode) 44 is disposed between adjacent pixels and a second electrode (pixel electrode) 43 is disposed over the entire pixel display area. The second electrode also functions as a reflection plate for reflecting incident light and is covered with an insulating film so as not to take electric charges away from electrophoretic particles.

In the horizontal movement type display apparatus, the insulating liquid is transparent and as shown in FIG. 10(*a*), the second electrode 43 is covered with electrophoretic particles 47 to effect black display. Further, as shown in FIG. 10(*b*), the colored electrophoretic particles are collected to the first electrode 44 located between the adjacent pixels to expose the second electrode 43, thus performing white display. As a result, by controlling a polarity of an applied voltage pixel by pixel, it is possible to display an image.

The electrophoretic display apparatus has a memory characteristic, different from most liquid crystal apparatuses. The power of the display apparatus can be held in an off state when the display operation is kept, so that the display apparatus is advantageous in the case where it is assumed that the display apparatus is used in various environments as in the wearable PC.

When the electrophoretic display apparatus is used as the wearable PC or the paperlike display, it is important that the display portion is flexible, i.e., resistive to bending to some extent. It is possible to provide the flexibility to the substrate by forming the substrate with a plastic film. However, in order to provide such a strength that it is capable of resisting repetitive bending, it can be considered that a thin film of metal such as stainless steel is used as the substrate.

However, when the above described electromagnetic induction type coordination position detection apparatus is mounted to such a display apparatus using the metal substrate, the electroconductive metal substrate is interposed between the position detection device and the pen, so that an electromagnetic field produced from the position detection device and the pen generates eddy-current in the metal substrate. For this reason, there has arisen such a problem that the electromagnetic field is attenuated to worsen a sensitivity for position detection.

Similarly as in a touch panel, it can be also considered that the position detection device is constituted by a transparent member and is disposed at a front surface of the display apparatus. JP-A Hei 08-202487 has proposed an electromagnetic induction type position detection apparatus (digitizer) wherein a plurality of coils comprising transparent substrate and transparent electrode are used in combination and dummy wiring is provided in order to obviate a change in transparent electrode, whereby the change in transmittance of the position detection device is not caused to occur.

However, the position detection device is formed by combining the plurality of coils comprising transparent substrate and transparent electrode or effecting the dummy wiring, so that it has a certain thickness. For this reason, an actual distance between the display surface and the pen contact surface becomes large, whereby parallax is caused. As a result, a user has such a sense that it is difficult to write or there is conformity, considerably different from the case where writing is performed in ordinary paper. Further, light passes through at least a thickness corresponding to two layers of transparent electrode, so that there also arises such a problem that a resultant light amount is decreased to approximately 90% compared with the case where a sensor is not provided at the surface of the display apparatus it varies depending upon the thickness.

DISCLOSURE OF THE INVENTION

The present invention accomplishes to solve the above described problems.

An object of the present invention is to provide a display apparatus capable of performing high-accuracy coordinate position detection by using a display including, as a substrate material, a thin metal plate which is not readily broken and is electroconductive.

Another object of the present invention is to provide such a display apparatus without providing inconformity to a user and impairing a luminance.

According to an aspect of the present invention, there is provided a display apparatus, comprising:

a substrate comprising a metal layer, a plurality of scanning signal lines and a plurality of data signal lines which intersect with each other and are disposed on the substrate, a display device which has a display element located at an intersecting position of the scanning and data signal lines and is driven by a voltage signal supplied to the scanning and data signal lines, a plurality of coils disposed in parallel with each other on the substrate, and a circuit for detecting currents passing through the plurality of coils by the action of electromagnetic induction of an electromagnetic wave locally generated at a surface of the display device to determine a generation position of the electromagnetic wave by a position of the coils through which the currents pass.

According to another aspect of the present invention, there is provided a display apparatus, comprising:

a substrate comprising a metal layer which has an electromagnetic wave transmissive structure, a plurality of scanning signal lines and a plurality of data signal lines which are disposed on the substrate, a display device which is disposed on the substrate in a matrix and is driven by a voltage signal supplied to the scanning and data signal lines, a plurality of coils disposed, opposite from the display device, in parallel with each other on the substrate, and a circuit for detecting currents passing through the plurality of coils by the action of electromagnetic induction of an electromagnetic wave locally generated at a surface of the display device to determine a generation position of the electromagnetic wave by a position of the coils through which the currents pass.

According to a further aspect of the present invention, there is provided an input apparatus, comprising:

a substrate comprising a metal layer, a plurality of scanning signal lines and a plurality of data signal lines which intersect with each other and are disposed on the substrate, a display device which has a display surface located at an intersecting position of the scanning and data signal lines and is driven by a voltage signal supplied to the scanning and data signal lines, a pen which designates a position on the display surface and generates an electromagnetic wave locally at the designated position at the same time, a plurality of coils disposed in parallel with each other on the substrate, and a circuit for detecting a current passing through the plurality of coils by the action of electromagnetic induction of the electromagnetic wave locally generated at the display surface with the pen to determine a generation position of the electromagnetic wave by a position of the coils through which the current passes.

These and other objects, features and advantages of the present invention will become more apparent upon a consideration of the following description of the preferred embodiments of the present invention taken in conjunction with the accompanying drawings.

BEST MODE FOR CARRYING OUT THE INVENTION

Figure 1:
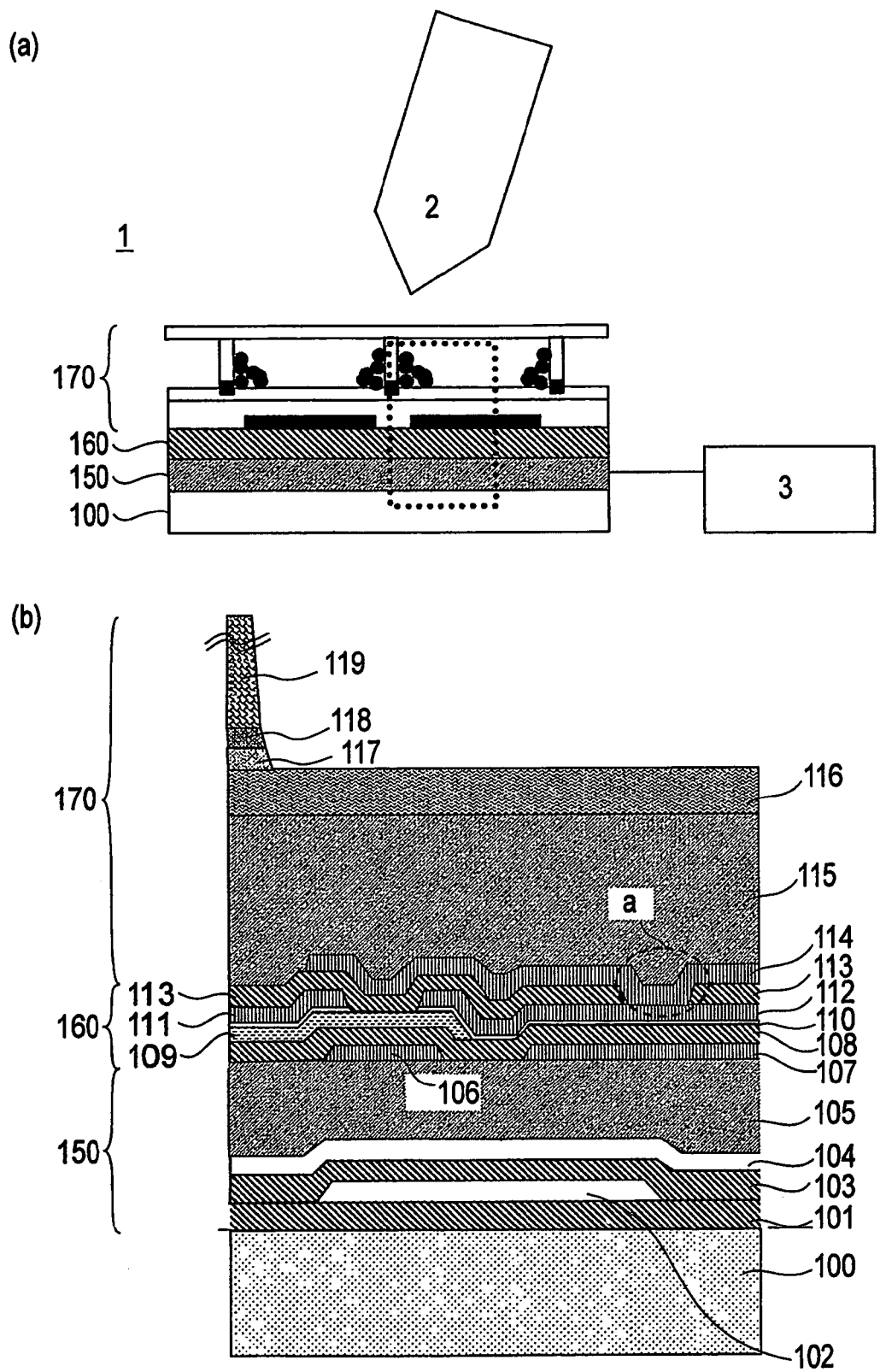
FIGS. 1(a) and 1(b) are schematic sectional views showing a display apparatus according to a First Embodiment of the present invention.

FIGS. 1(a) and 1(b) schematically show a display apparatus according to the First Embodiment of the present invention.

FIG. 1(a) schematically illustrates a general structure of the display apparatus.

A display apparatus 1 includes a display portion 170, a driving portion 160 constituted by TFTs and their wiring for driving the display portion 170, and a sensor portion 150 for detecting a coordinate position. These portions are laminated on a substrate 100. As the display portion 170, an electroconductive display apparatus having a memory characteristic is used, and the electroconductive display apparatus is driven by the TFTs.

In FIG. 1(a), a pointing member 2 such as a pen is a means for designating a position from above the display apparatus 1 and is used together with the display apparatus 1. The pen 2 designates the position on the display surface and produces an electromagnetic wave at the same time. At that time, the sensor portion 150 detects a current passing through a sensor by an electromagnetic action and sends a current signal to a detection circuit 3. In the detection circuit, the current signal is analyzed to determine a positional coordinate of the pen 2 on the display surface. The detection circuit 3 may be disposed outside the display apparatus 1 but may be mounted onto the substrate 100 to be integrated with the display apparatus 1.

Generation of the electromagnetic wave from the pen 2 may be effected by such a pen that it per se has an electromagnetic wave generating device but may be performed by resonating a coil contained in a pen by applying an AC voltage to a coil of the sensor portion.

FIG. 1(b) is a sectional view enlarged at a rectangle dotted-line portion indicated in FIG. 1(a).

The substrate 100 is formed of a metal sheet to exhibit electroconductivity and is surface-coated with an insulating layer 101. On the substrate, the electromagnetic induction type position detection sensor portion 150 and the driving portion 160 having a TFT matrix are laminated. The metal sheet has a flexibility to such an extent that the entire display apparatus is flexible and causes to crack or break against repetitive flexion deformation.

The position detection sensor portion 150 includes the insulating layer 101, an X-axis direction sensor wiring portion 102 formed on the insulating layer 101, an insulating layer 103 formed on the portion n102, a Y-axis direction sensor wiring portion 104 formed on the insulating layer 103, and an insulating layer 105 formed on the portion 104.

The driving portion 160 includes a gate wiring portion 106, a storage capacitor (Cs) wiring portion 107, an insulating film 108, an amorphous semiconductor layer 109, an ohmic contact layer 110, a source electrode 111, a drain electrode 112, and an insulating layer 113.

The display portion 170 includes a pixel electrode 114, a scattering layer 115, an insulating layer 116, a common electrode 117, a light-blocking layer, and a partition wall 119.

Figure 2:
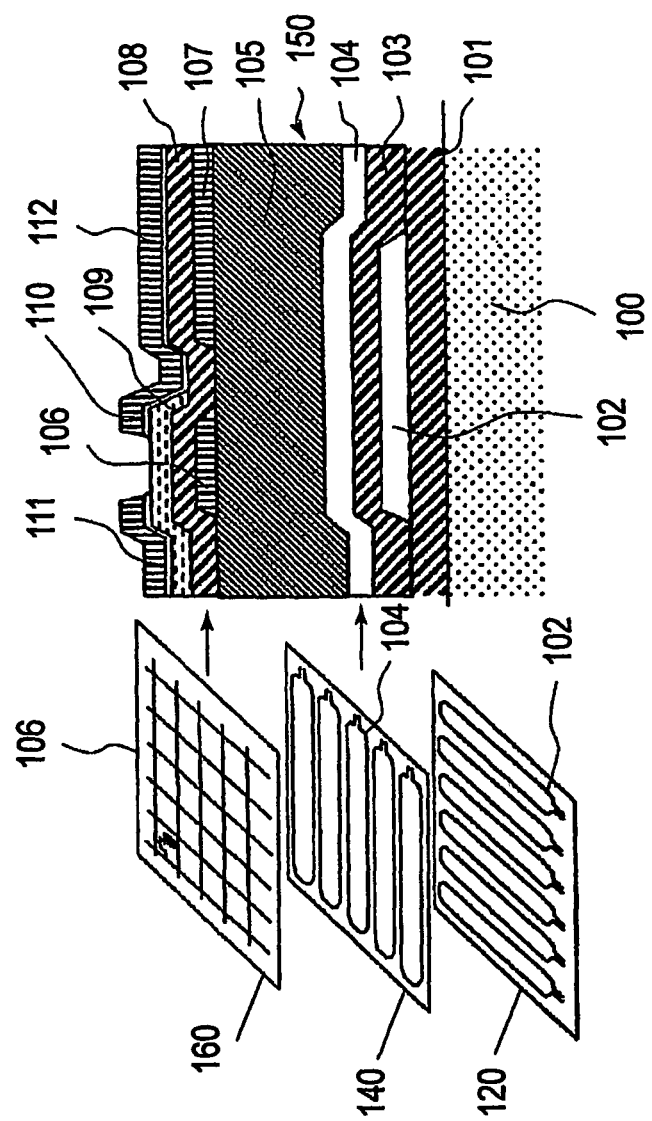
FIG. 2 is a view showing a cross-section and wiring state of a part of the display apparatus of the First Embodiment.

The respective layers have wiring patterns shown in FIG. 2. A right-hand portion of FIG. 2 shows a portion under the display portion 170 and a left-hand portion of FIG. 2 shows wiring patterns at the respective layers.

As shown in FIG. 2, the position detection sensor 150 has a lamination structure including the electromagnetic induction coil layer 120 for performing sensing in the X-axis direction and the electromagnetic induction coil layer 140 for performing sensing in the Y-axis direction. The X-axis sensing coil layer 120 includes a plurality of coils 102 each arranged in parallel with each other and extended in the Y-axis direction to form a loop. Each of the coils 102 is led from both ends of the loop to the outside of the coil layer 120. The coils 102 effect sensing in the X-axis direction. The number and density of the coils 102 are determined depending on an accuracy of positional coordinates to be subjected to the sensing.

When a position is designated by a pen or the like from above the display portion, an electromagnetic wave produced from the pen generates a current by electromagnetic induction on the coils 102. The generated current is detected by an external circuit, so that an X-axis coordinate of the position where the pen is placed is determined on the basis of a position of a coil which generates the intersect electromagnetic induction current. In a similar manner, a Y-axis coordinate of the pen position is determined based on the electromagnetic induction currant generated in the coil layer 140 in the Y-axis direction.

Figure 3:
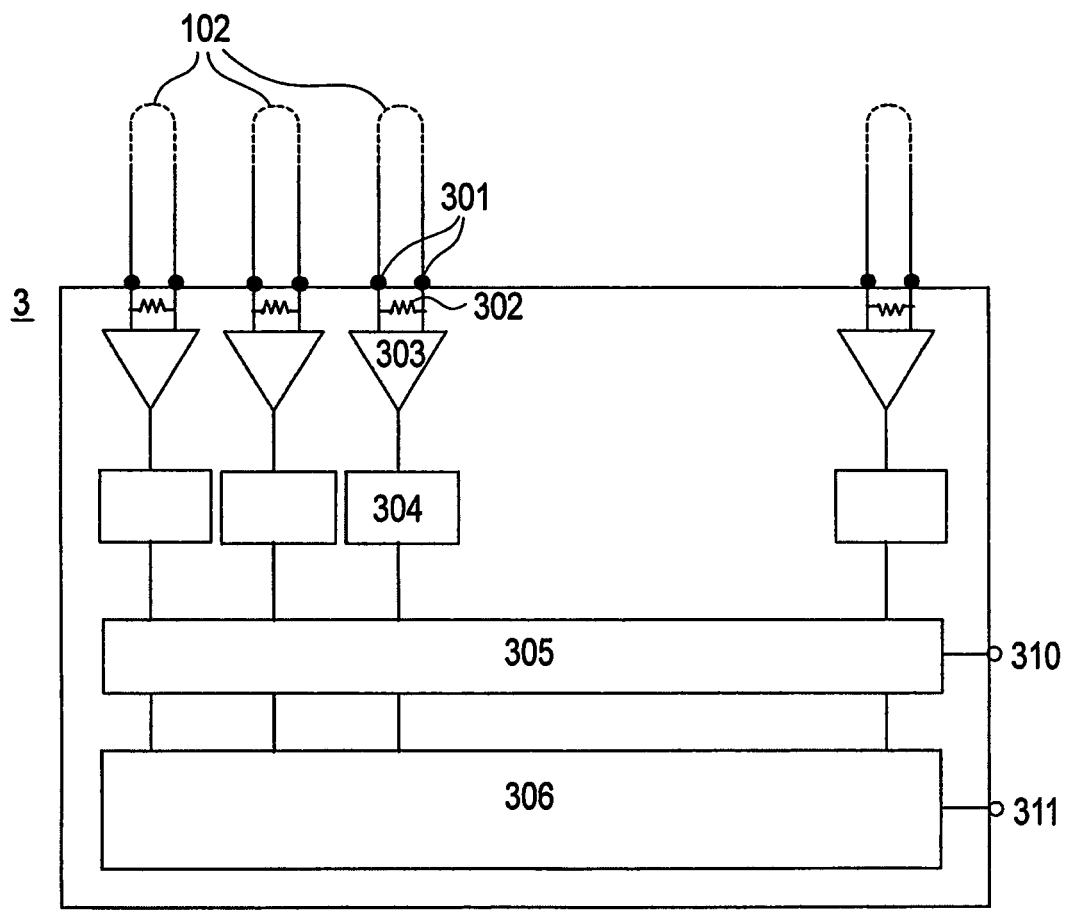
FIG. 3 is a view showing a current detection circuit.

FIG. 3 shows a structure of the detection circuit 3 shown in FIG. 1 only at a detection portion in the X-axis direction.

The detection circuit 3 is provided to each of the X-axis direction sensor 120 and the Y-axis direction sensor 140 to determine (identify) the X coordinate and the Y coordinate of the pen position. Hereinbelow, only the X-axis direction sensor 120 will be described but similar description can be made with respect to the Y-axis direction sensor 140.

Referring to FIG. 3, input terminals 301 are connected by a resistance 302, so that an induced current passing through the coil layer 120 is converted into a voltage value between both ends of the resistance 302. This voltage is amplified by an amplifier 303 and converted into digital form by an AD conversion circuit 304. The digitized voltage is sampled by all the coils at the same time by use of a timing signal 310 latched by a latch circuit 305, and inputted into a comparator 306. The comparator 306 compares the digital signals and based on the resultant values, identifies a coil through which a maximum current passes, and outputs the number of the coil, i.e., a position coordination of the pen in the X-axis direction to an output terminal 311. The timing signal 310 for determining the timing of sampling is supplied from an external control circuit (not shown).

In FIG. 2, the gate wiring portion 106 and the source wiring portion 111 of the drive portion 160 are extended in the X-axis direction and the Y-axis direction, respectively, to constitute scanning signal lines and data signal lines. At an intersection of the gate wiring portion 106 and the source wiring portion 111, a TFT is constituted by the insulating film 108, the amorphous semiconductor layer 109, and the ohmic layer 110, and the drain electrode 112 of the TFT is electrically connected with the pixels electrode 114 through a contact hole a (shown in FIG. 1(b)) provided in the insulating layer 113 disposed on the drain electrode 112.

Figure 4:
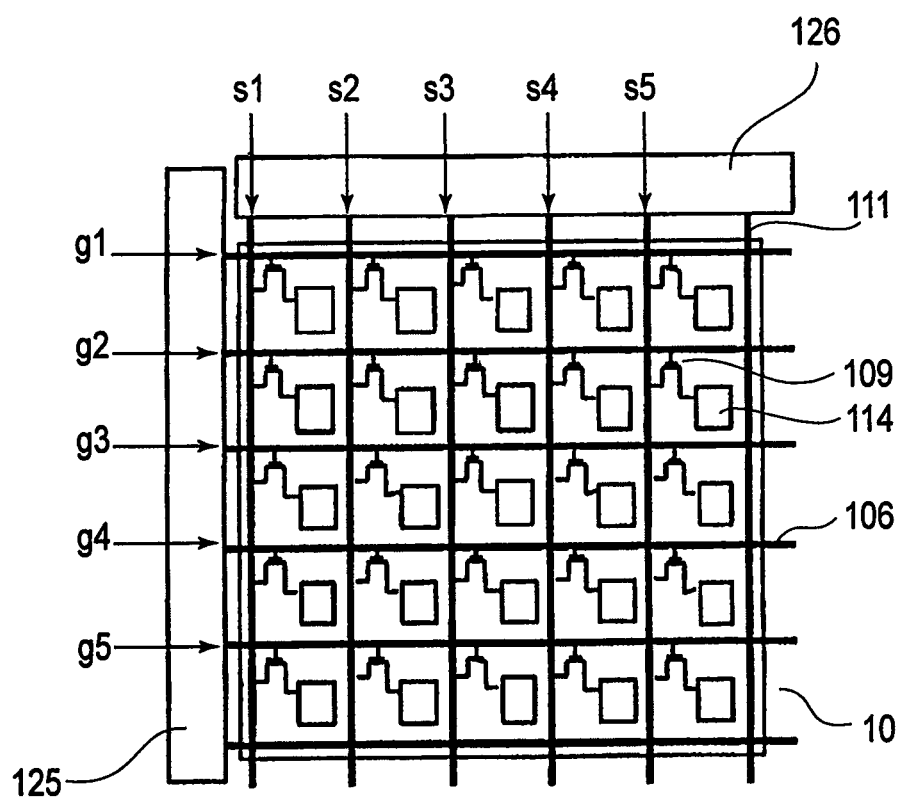
FIG. 4 is a schematic view showing a TFT (thin film transistor) backplane.

FIG. 4 shows a planar arrangement of a display panel 10 constituted by the above described substrate 100, sensor portion 150, drive portion 160, and display portion 170. Reference numerals indicated in FIG. 4 are used for describing the same members or means shown in FIG. 2.

As shown in FIG. 4, the display portion 150 (FIG. 2) has a display surface by arranging the pixels electrodes 114, as one (group) of the electrodes of the display device, in a matrix. The other electrode (group) of the display device is formed on an opposite substrate (not shown) or a side surface of a partition wall (not shown) located at a peripheral portion of the pixels, and a common potential is applied to all the pixels. Each of the pixels is constituted by an electrophoretic device including electrophoretic particles and a liquid for dispersing and holding the electrophoretic particles therein.

At the periphery of the display panel 10, a scanning line drive circuit 125 and a data line drive circuit 126 for supplying voltage signal to scanning (gate) signal lines g1, g2, g3, . . . and data (source) signal lines S2, S2, S3, . . . , respectively.

From these circuits, a TFT gate-on voltage of +20 V and a TFT gate-off voltage of −20 V are supplied to the scanning signal lines, and a TFT source line voltage of 0-15 V is supplied to the data signal lines. A common electrode potential is fixed at 7.5 V.

In this embodiment, the position detection sensor portion 150 is mounted on the substrate 100 formed with the metal sheet, so that when writing with the special-purpose pen 2 as the position designation means is performed from above the second substrate (opposite substrate), an electromagnetic field produced locally at a point of the pen 2 affects the sensor coil portion 150 without being blocked. As a result, position detection with high reliability can be effected by use of the loop-shaped wiring portions 102 and 104.

In the above description, the display portion is described as the electrophoretic display device. However, the present invention is not limited thereto. It is also possible to use a reflection-type liquid crystal display device.

Further, in FIGS. 1(a) and 1(b), an inverted staggered type TFT using amorphous silicon is employed but the TFT used in the present invention may also be those of other types including a staggered type, a planar type, an inverted planar type, etc. Further, instead of the amorphous silicon TFT, it is also possible to employ a polysilicon TFT with laser annealing or a transfer technique using a single-crystal TFT.

Hereinbelow, the Second Embodiment of the present invention will be described with reference to FIGS. 5-8.

A display apparatus used in this embodiment, similarly as in the First Embodiment, displays various pieces of information such as an image and character, and permits a coordinate detection according to the electromagnetic induction scheme.

Figure 5:
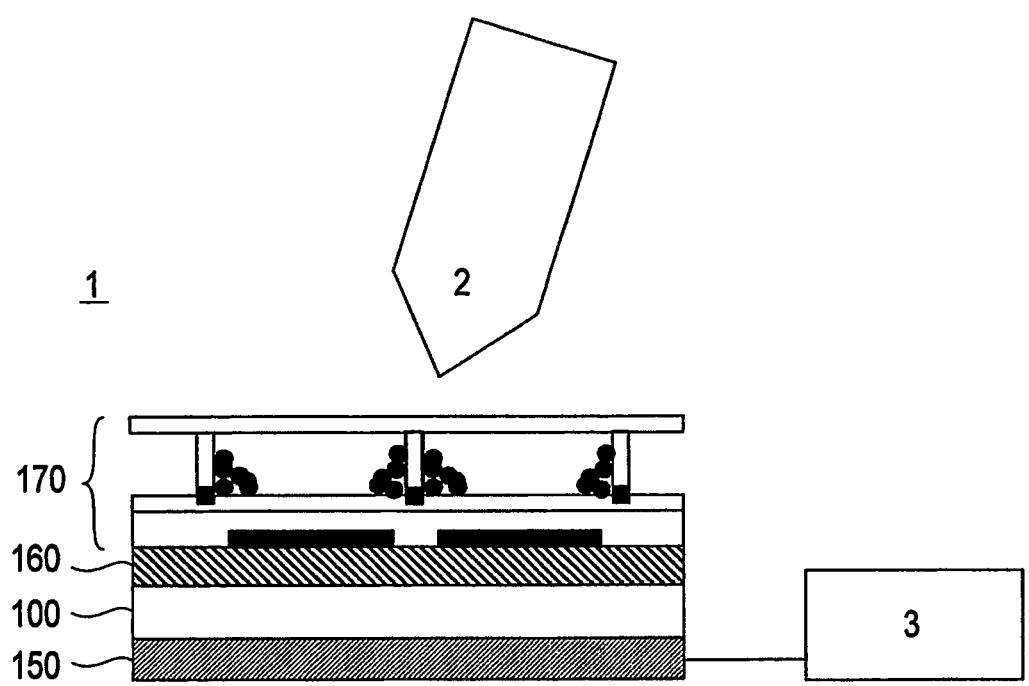
FIG. 5 is a schematic view showing a general structure of a display apparatus according to a Second Embodiment of the present invention.

FIG. 5 shows a structure of a display apparatus 51 used in this embodiment.

Referring to FIG. 5, a substrate has the following structure.

On an upper surface of the substrate 100, a drive layer (portion) 160 for driving a display portion and a display layer (portion) 170 including a display device are laminated. The drive portion 160 and the display portion 170 have the same structures as those described in First Embodiment and shown in FIGS. 1(a) and 1(b). Specifically, on the substrate, the gate wiring portion, the source wiring portion, and the TFTs, are formed and thereon, a display device having electrodes connected to the TFTs is disposed.

On a lower surface, of the substrate 100, opposite from the upper surface on which the drive and display portions 160 and 170 are disposed, a position detection sensor layer (portion) 150 is disposed. The position detection sensor portion 150 has the same structure as in the First Embodiment shown in FIGS. 1(a), 1(b) and 2 except that the positional relationship between the substrate 100 and the position detection sensor portion 150 is inverted. The position detection sensor portion 150 has such a substrate that position sensor coils in an X-axis direction and position sensor coils in a Y-axis direction perpendicularly, intersect with each other via an insulating layer and are laminated on the substrate. These sensor coils may be formed at the lower surface of the substrate 100 or applied to the lower surface of the substrate 100 after being once formed on another substrate.

The sensor portion 150 is an electromagnetic induction type digitizer identical to that used in the First Embodiment and has a plurality of sensor coils (looped coils).

An input pen 2 has a resonance circuit and a coordinate of a position of the input pen 2 is detected according to a known method by passing or not passing a current through the sensor coils at high speed.

As described above, in this embodiment, the position detection sensor portion 150 is disposed under the electroconductive substrate film, i.e., on an opposite side from the display portion. Further, the substrate 100 is provided with a means for obviating attenuation of an electromagnetic wave generated from the pen placed on the display portion 170. As a result, it becomes possible to detect the electromagnetic wave by the sensor disposed on the opposite side of the substrate 100.

The substrate 100 used in this embodiment includes a metal layer which may be a metal plate or a thin sheet-like metal film when flexibility is required.

The means for obviating attenuation of the electromagnetic wave may be provided to the substrate 100 in any one of the following methods (1)-(3).

(1) A plurality of through holes are provided in the metal layer.

(2) A layer of metal mesh sheet, into which metal fiber is woven in a mesh form, is embedded in a resin film.

(3) A wavy uneven metal layer is embedded in a resin film.

Metal is resistive to plastic deformation, so that even when any of the methods (1)-(3) is employed, it is possible to perform high-accuracy coordinate detection without impairing the substrate strength in a sense that the resultant substrate is resistive to repetitive deformation such as bending or folding.

Figure 6:
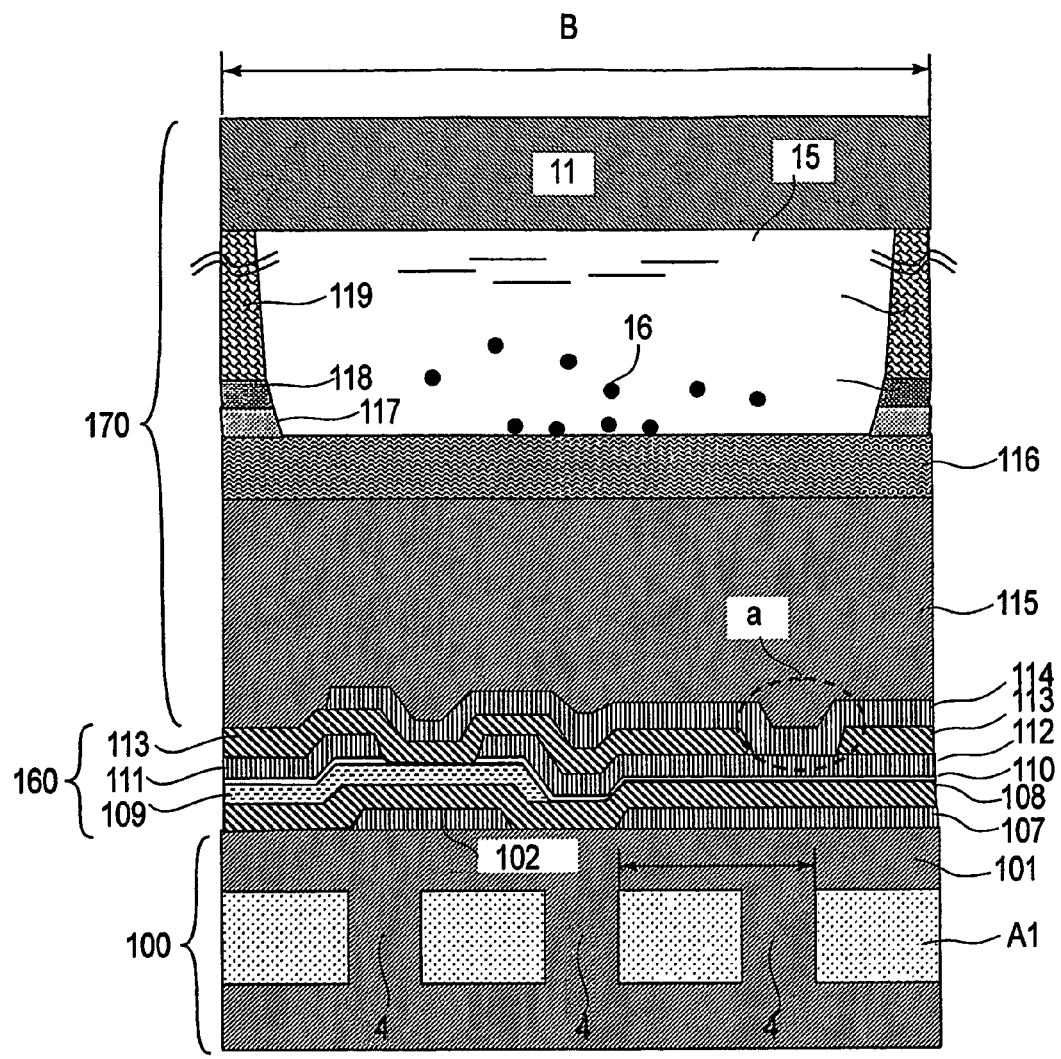
FIGS. 6, 7 and 8 are views showing other examples of the display apparatus of the Second Embodiment.

A structural embodiment of the method (1) is shown in FIG. 6.

A substrate 100 includes a thin electroconductive metal plate (electroconduction film) A1 and an insulating material 101. Through holes 4 are provided in the electroconductive (metal) film A1 at a pitch P. Further, the through holes 4 are filled with the insulating material 101, and the entire (upper and lower)-surfaces of the electroconductive film A1 is coated with the insulating material 101.

A display portion 170 is constituted by an electroconductive display device. On a TFT backplane of a drive portion 160, a pixel electrode 114 is disposed through an insulating layer 113 and is electrically connected with a drain electrode 112 through a contact hole a. Further, on the pixel electrode 114, a scattering layer r115 and an insulating layer 116 are laminated.

On the insulating layer 116, an insulating liquid 15 and charged electrophoretic particles 16 dispersed in the insulating liquid 15 and held by being surrounded by a transparent display-side substrate 11 and a partition wall 119. An area B defined by the partition wall 119 constitutes one pixel. Under the partition wall 119, a common electrode 117 having the same potential as those of adjacent pixels and a light-blocking layer 118 are disposed along the partition wall 119. Other reference numerals indicated in FIG. 6 represent the same members or means as those shown in FIGS. 1(a) and 1(b).

The size of the through hole 4 may be smaller than that (width B) of one pixel and in a preferred embodiment, two or more through holes 4 are disposed at each pixel. More specifically, when the width B of one pixel is 80 μm, the pitch P of the through hole 4 may preferably be not more than approximately 40 μm. By providing the through holes 4 in such a manner, it is possible to ensure flexibility of the information display device and prevent attenuation of magnetic flux in combination. As the electroconductive film A1, it is preferable that a metal plate which is not readily cracked and is rich in flexibility.

Figure 7:
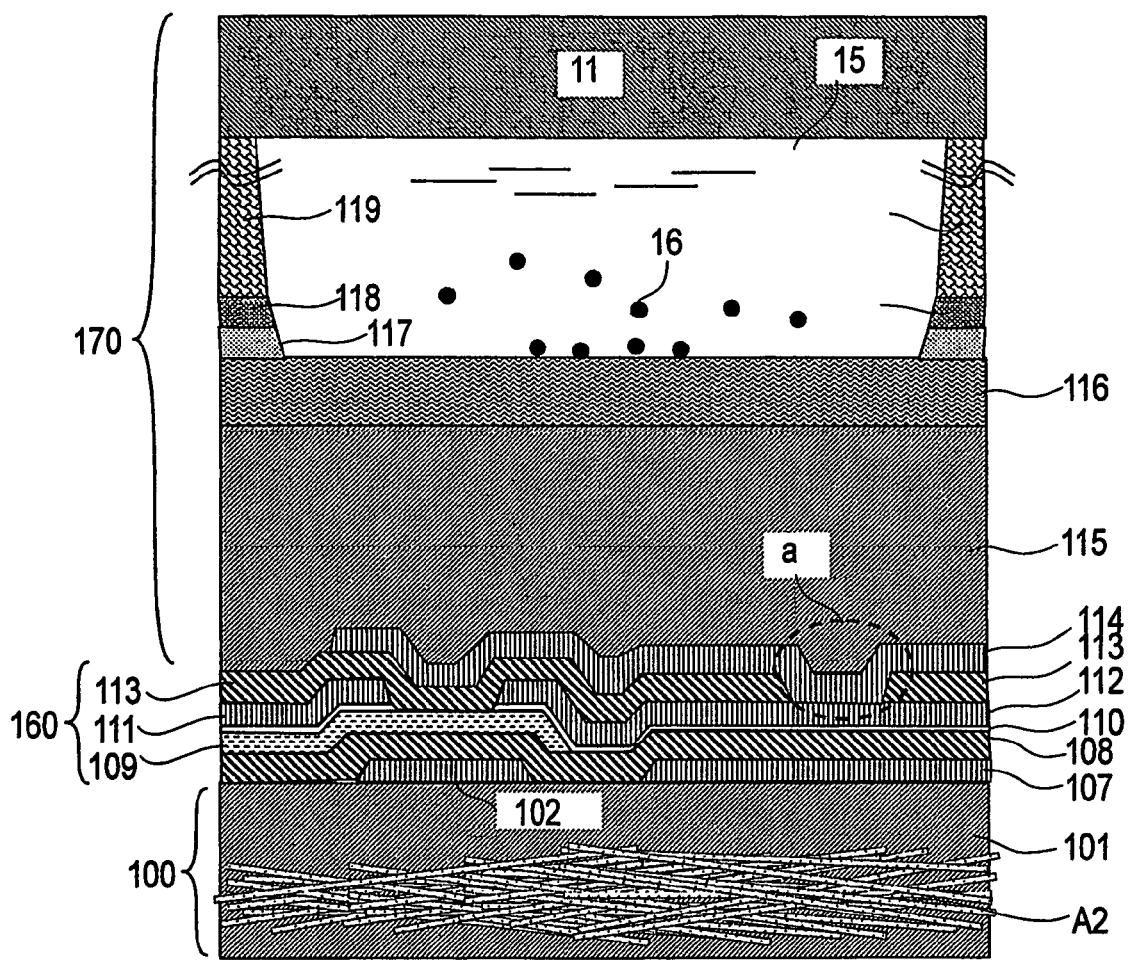

A structural embodiment of the above described method (2) is shown in FIG. 7.

In FIG. 7, a substrate 100 is formed with a mesh film A2 into which ultrafine fibers of stainless steel are woven and an insulating resin film 101 which coats the mesh film A2 from both (upper and lower) sides of thereof. As the mesh film, e.g., a film (trade name "SUSMIC", mfd. by Tokyo Rope Mfg. Co., Ltd.) may preferably be used.

Figure 8:
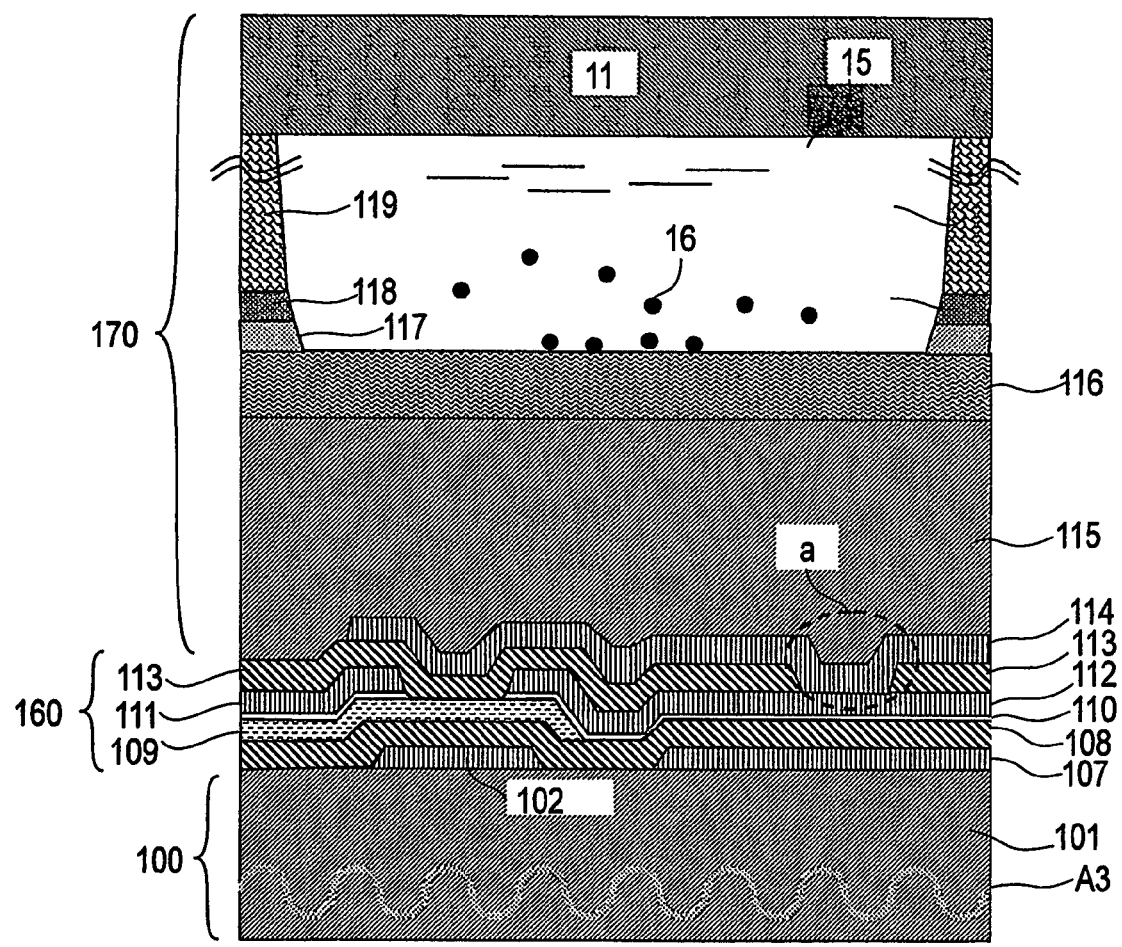
Figure 9:
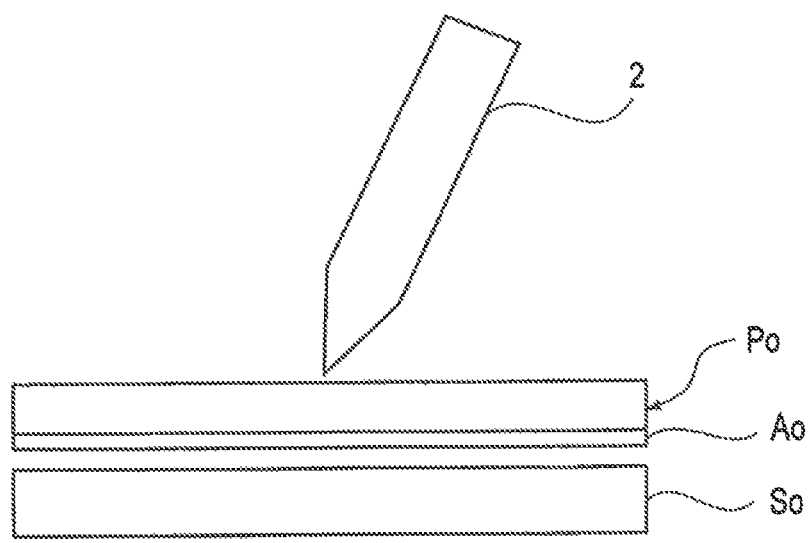
FIG. 9 is a schematic view showing an embodiment of a structure of a conventional display apparatus.
Figure 10:
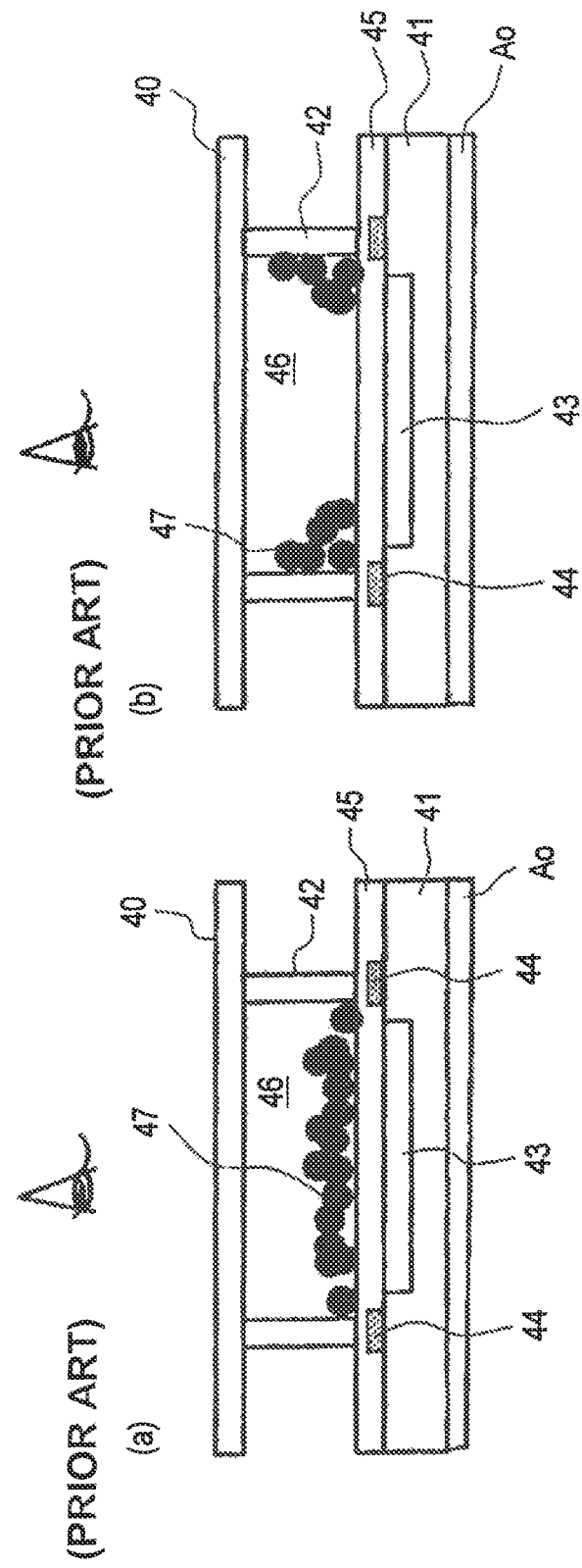
FIGS. 10(a) and 10(b) are sectional views showing an embodiment of a structure of an electrophoretic display device.

A structural embodiment of the method (3) is shown in FIG. 8.

In FIG. 8, a substrate 100 is formed of an uneven electroconductive metal plate A3 and an insulating resin film 101 in which the metal plate A3 is embedded. The metal plate A3 may be prepared by subjecting a metal plate to embossing to bend the metal plate so as to have undulation. By providing the metal plate with such an unevenness, it is possible to enhance rigidity. As a result, the metal plate per se has a small thickness of about 10 μm, so that it is possible to prevent a lowering in sensitivity for coordinate detection.

As the display portion 170, in the present invention, it is possible to employ a liquid crystal display device or an electrophoretic display device. Such a display device may preferably be of a reflection type and also of an active matrix type using switching element such as TFT. In the case of the active matrix type display device, the driving portion 160 includes a scanning electrode, a data electrode, a switching element, etc.

The above described metal layers A1, A2 and A3 are coated with the insulating layer 101 at both (upper and lower) surfaces thereof, thus ensuring wiring thereof with upper and lower portions and electrical insulation from the switching element, etc.

According to this embodiment, the metal layers A1, A2 and A3 tolerate leakage of magnetic flux between the sensor portion 150 and the input pen 2, so that it is possible to prevent a lowering in sensitivity for coordinate detection.

Hereinbelow, the present invention will be described more specifically based on Examples.

Example 1

In this example, the display apparatus according to First Embodiment of the present invention is prepared in the following manner.

A substrate 100 is a thin electroconductive SUS foil or plate. An insulating film 101 disposed on the substrate 100 is formed of an insulating material such as SiN or a resin material. As wiring (metal coils) 102 and 104, a wiring material of Al which exhibits a low electric resistivity is used but in the case where there is a subsequent step including a production process performed at a temperature that exceeds a melting temperature of Al, a metal material such as Cr, Ta or Al—Nd is used instead of Al. Such a metal material is vapor-deposited on the insulating film by sputtering and thereon, a photoresist is applied and subjected to selective exposure and development, followed by etching of the metal film to form a loop-like wiring portion. As a TFT 109, a thin film of an amorphous semiconductor is used.

More specifically, the display apparatus of the First Embodiment of the present invention can be prepared through the following production steps.

(Step of Forming Position Detection Sensor Portion)

(1) A 500 nm-thick SiN film 101 is formed on a 0.2 mm-thick SUS film by chemical vapor deposition (CVD).

(2) On the SiN film 101, a 300 nm-thick Al—Nd layer is formed by sputtering.

(3) By using a photomask, an X-axis sensing wiring portion 102 is formed, and thereon a 500 nm-thick SiN film 103 is formed.

(4) On the SiN film 103, a 300 nm-thick Al—Nd layer is formed by sputtering.

(5) By using a photomask, a Y-axis sensing wiring portion 104 is formed.

(6) On the wiring portion 104, a 2 μm-thick insulating and smooth layer 105 of acrylic resin is coated by use of a spinner. Instead of the acrylic resin, it is possible to use another resin such as epoxy-based resin so long as a resultant film state is not changed in subsequent steps (e.g., by film formation, curing temperature, etc.). Further, it is also possible to form an SiN film. In this case, however, it is difficult to realize a film thickness of not less than 1 μm in CVD used when the SiN film is formed, from the viewpoint of deposition time. In addition, a dielectric constant εr is about 4, so that when the film thickness is excessively small, there is a possibility such that parasitic capacitance with respect to, e.g., gate wiring is increased to cause a driving problem. As a result, it is necessary to pay attention to designing of the SiN film.

(Step of Forming Drive Portion (TFT backplane))

(7) On the acrylic resin layer 105, a 200 nm-thick Al—Nd layer is formed by sputtering, and TFT lower electrodes such as a gate wiring portion 106 and a Cs wiring portion 107 are formed by use of a photomask. Incidentally, in this example, the electrophoretic display apparatus needs a capacitance when a holding drive of TFT is performed. For this reason, the Cs wiring portion 107 is formed in the same layer as the gate wiring portion 106.

(8) As an interlayer insulating film and a semiconductor layer, a 250 nm-thick SiN film 108 and a 200 nm-thick a-Si (amorphous silicon) film 109 are formed by CVD.

(9) As an ohmic contact layer, a 20 nm-thick a-Si (n$^+$) film 110 is formed by CVD.

(10) On the ohmic contact layer 110, a 200 nm-thick Al—Nd layer is formed by sputtering.

(11) By using a photomask, a source wiring portion 111 containing TFT portion, and a drain electrode 112 are formed through wet etching.

Thereafter, the a-Si (n$^+$) layer 110 at a TFT channel portion is removed through dry etching by use of the same resist pattern to form a 300 nm-thick SiN film 113.

(Step of Forming Display Portion)

(12) In the SiN film 113, a contact hole is formed as shown in FIG. 1(b) by dry etching to expose a part of the drain electrode 112.

(13) On the SiN film 113, a 200 nm-thick Al—Nd layer is formed by sputtering.

(14) By using a photomask, a pixel electrode 114 is formed through wet etching.

(15) Onto the pixel electrode 114, a 4 μm-thick acrylic resin layer containing $TiO_2$ is applied, thus forming a white scattering layer 115.

(16) On the scattering layer 115, a 1 μm-thick acrylic resin layer 116 is formed as an insulating film.

(17) On the insulating film 116, a 300 nm-thick Ti layer 117 and a 300 nm-thick photoresist layer containing carbon black are successively formed.

(18) On the photoresist layer 118, a 15 μm-thick photoresist is formed and subjected to development so as to leave a portion between adjacent pixels, thus forming a partition wall 119 between the adjacent pixels.

(19) By using the partition wall 119 formed of the thick photoresist, the Ti layer 117 and the carbon black containing photoresist layer 118 are subjected to etching to form a TFT backplane.

(20) Finally, a dispersion liquid in which black electrophoretic particles 121 of carbon black-containing polystyrene resin are dispersed in an insulating liquid 120 of a paraffin-based hydrocarbon solvent as a main component, is filled and fixed in a space defined by the partition wall 119 so that a transparent second (opposite) 122 is caused to contact the partition wall 119. The partition wall 119 and the second substrate 122 are fixed with an adhesive (not shown).

Example 2

In this example, the display apparatus of Second Embodiment of the present invention is prepared in the following manner.

First, the structure of display apparatus will be described with reference to FIG. 6.

In this example, a 100 μm-thick SUS sheet A1 in which a multiplicity of through holes 4 are formed with an opening width of 20 μm, is used. Further, as an insulating liquid 15, it is possible to use a liquid principally comprising a paraffin-based hydrocarbon solvent. As charged electrophoretic particles 16, it is possible to use black particles of carbon black-containing polystyrene resin.

The SUS substrate A1 and the through holes 4 are coated and filled with an acrylic resin layer (thickness: 2 μm) for electrical insulation and smoothness. Further, it is also possible to use an SiN epoxy-based resin film instead of the acrylic resin. In the latter case, however, it is difficult to realize a film thickness of not less than 1 μm in CVD used when the SiN film is formed, from the viewpoint of deposition time. In addition, a dielectric constant er is about 4, so that when the film thickness is excessively small, there is a possibility such that parasitic capacitance with respect to, e.g., gate wiring is increased to cause a driving problem. As a result, it is necessary to pay attention to designing of the SiN film.

The structures and materials of a drive portion 160 and a display portion 170 are identical to those in Example 1.

Referring to FIG. 6, on a substrate 100, a gate electrode 102 and a Cs electrode 107 are disposed. The Cs electrode 107 is used for constituting a supplemental capacitor at a portion between the Cs electrode 107 and a pixel electrode 114.

On these electrodes 102 and 107, a TFT including a gate insulating film 108 of SiN film (250 nm), a semiconductor layer 109 of a-Si film (200 nm), an ohmic contact layer 110 of a-Si ($n^+$) film (20 nm), a source electrode 111, and a drain electrode 112, is disposed.

A white scattering layer is formed of a 4 μm-thick acrylic resin containing $TiO_2$. An insulating film 116 is formed of a 1 μm-thick acrylic resin. A common electrode 117 is formed of a 300 nm-thick Ti layer, and a light blocking layer 118 is formed of a 300 nm-thick carbon black-containing photoresist.

Next, a manufacturing method of the display apparatus in this example will be described.

In the SUS substrate A1, the multiplicity of through holes 4 are formed by etching. Onto both surfaces of the SUS substrate A1, a coating liquid comprising the acrylic resin is applied by a spinner to form the insulating layer 101.

On the acrylic resin insulating layer 101 located on the upper surface of the SUS substrate A1, the Al—Nd layer is formed in a thickness of 200 nm by sputtering and subjected to exposure with, e.g., a photomask and etching to effect patterning, thus forming the gate electrode 102 and the Cs electrode 107. The gate insulating film 108 of SiN film and the semiconductor layer 109 of a-Si film are formed by CVD so as to cover the gate electrode 102 and the Cs electrode 107. The ohmic contact layer 110 of a-Si ($n^+$) film is formed by CVD so as to cover the gate insulating film 108 and the semiconductor layer 109. On the surface of the ohmic contact layer 110, a 200 nm-thick Al layer is formed and subjected to wet etching to form the source electrode 111 and the drain electrode 112. By using the same resist pattern, the a-Si ($n^+$) layer 110 at the TFT channel portion is removed through dry etching to form an SiN film 113. In the SiN film 113, a contact hole a indicated by a broken line in FIG. 6 is formed by dry etching to expose a part of the drain electrode 112. A 200 nm-thick Al film is formed by sputtering so as to cover the exposed part and the a-Si ($n^+$) film 109 and then subjected to wet etching with a photomask to form the pixel electrode 114.

On the pixel electrode 114, the white scattering formed and thereon, the 300 nm-thick Ti film, a 300 nm-thick photoresist film, and a 15 μm-thick photoresist film are formed. The 15 μm-thick photoresist film is subjected to development to leave only a boundary portion between adjacent pixels, thus forming the partition wall 119. The 300 nm-thick Ti film and the 300 nm-thick photoresist film are subjected to etching with use of the partition wall 119 to form the Ti layer 117 and the light-blocking layer 118.

Finally, the insulating liquid 15 and the charged electrophoretic particles 16 are filled at each pixel and sealed with a display-side substrate 11.

According to this example, it is possible to prevent a lowering in sensitivity for position detection of the input pen 2.

Figure 11:
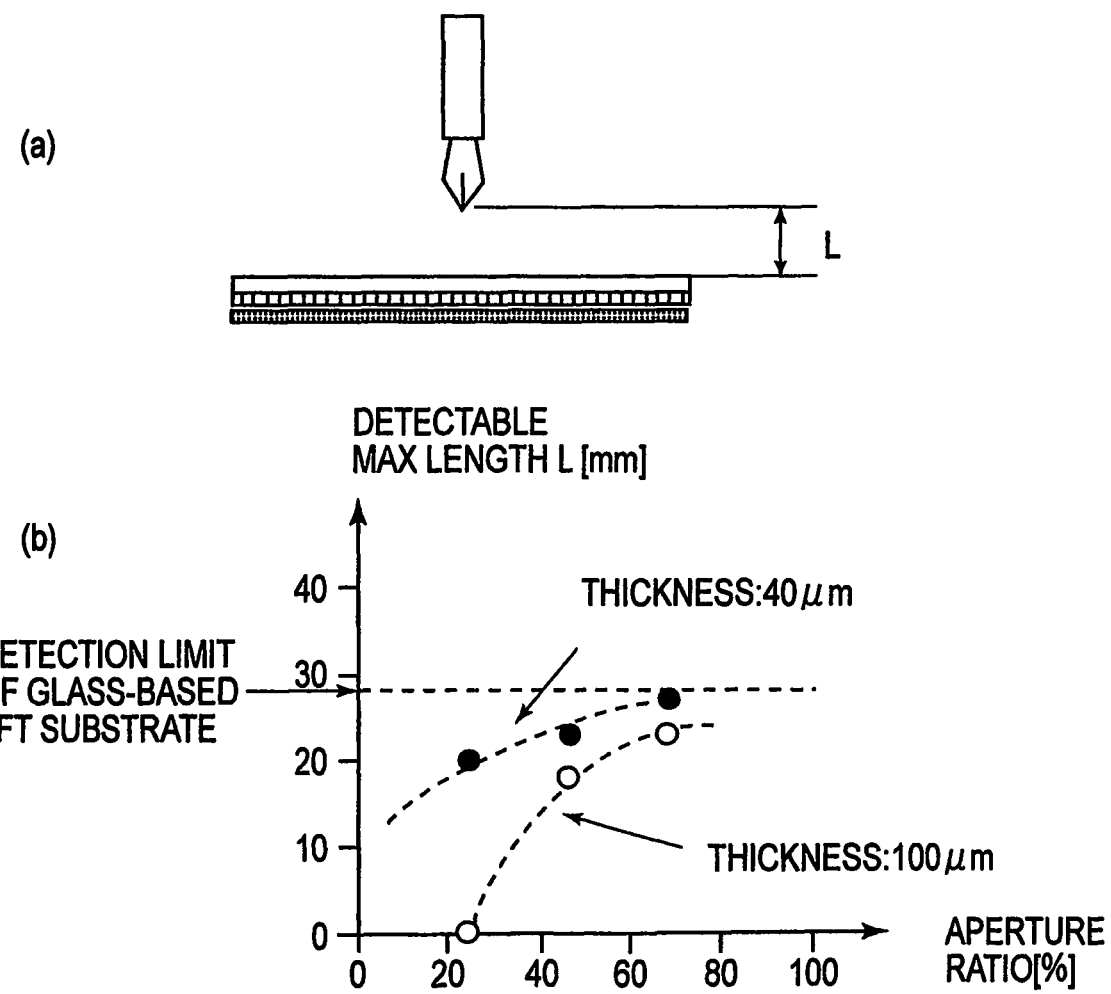
FIGS. 11(a) and 11(b) are views for illustrating a relationship between an aperture ratio of through hole and position detection limit when a TFT substrate is formed with a glass support.

According to an experiment by the present inventors, a relationship shown in FIGS. 11(a) and 11(b) is established between an aperture ratio (%) of the through holes 4 and a detectable maximum distance L (mm) for the input pen, i.e., a position detection limit, with respect to the thickness of the substrate. From the results of FIG. 11(b), it is possible to estimate an intensity of the electromagnetic wave passing through the through holes. As a result, it becomes possible to optimally design the thickness and the aperture ratio of the SUS substrate A1.

INDUSTRIAL APPLICABILITY

As described hereinabove, according to the present invention, by using a display including, as a substrate material, a thin metal plate which is not readily cracked or broken and is flexible, it is possible to provide a display apparatus capable of effecting high-accuracy coordinate position detection without giving a user to inconformity and impairing a luminance.

The invention claimed is:

1. A display apparatus, comprising:
a substrate comprising a metal layer,
a display device having a plurality of pixels and disposed on the substrate; and
a sensor portion for detecting a coordinate using electromagnetic induction,
wherein the sensor portion and the display device are disposed an opposite sides of the metal layer of the substrate from each other,
wherein the metal layer of the substrate is a metal sheet provided with a plurality of through-holes, and
wherein two or more of the through-holes of the metal sheet are disposed at each pixel.

2. A display apparatus according to claim 1, wherein the display device includes a display portion and a driving portion disposed between the display portion and the substrate.

3. A display apparatus according to claim 1, wherein the substrate further includes an insulating material, the through holes of the metal sheet are filled with the insulating material, and the entire surfaces of the metal sheet is coated with the insulating material.

4. A display apparatus according to claim 1, wherein the display device is a liquid crystal display device.

5. A display apparatus according to claim 1, wherein the display device is an electrophoretic display device.

6. An input apparatus, comprising:
a substrate comprising a metal layer,
a display device having a plurality of pixels and disposed on the substrate;
a pen which designates a position on a display surface of the display device and generates an electromagnetic wave locally at the designated position; and
a sensor portion for detecting a coordinate using electromagnetic induction,
wherein the sensor portion and the display device are disposed on opposite sides of the metal layer of the substrate from each other, wherein the metal layer of the substrate is a metal sheet provided with a plurality of through-holes, and wherein two or more of the through-holes of the metal sheet are disposed at each pixel.

7. An input apparatus according to claim 6, wherein the display device includes a display portion and a driving portion disposed between the display portion and the substrate.

8. A display apparatus according to claim 6, wherein the substrate further includes an insulating material, the through holes of the metal sheet are filled with the insulating material, and the entire surfaces of the metal sheet is coated with the insulating material.

9. A display apparatus according to claim 6, wherein the display device is a liquid crystal display device.

10. A display apparatus according to claim 6, wherein the display device is an electrophoretic display device.

* * * * *